Jan. 12, 1943.   L. R. NEAL   2,308,098
SOLDERING IRON STAND
Filed Aug. 11, 1941
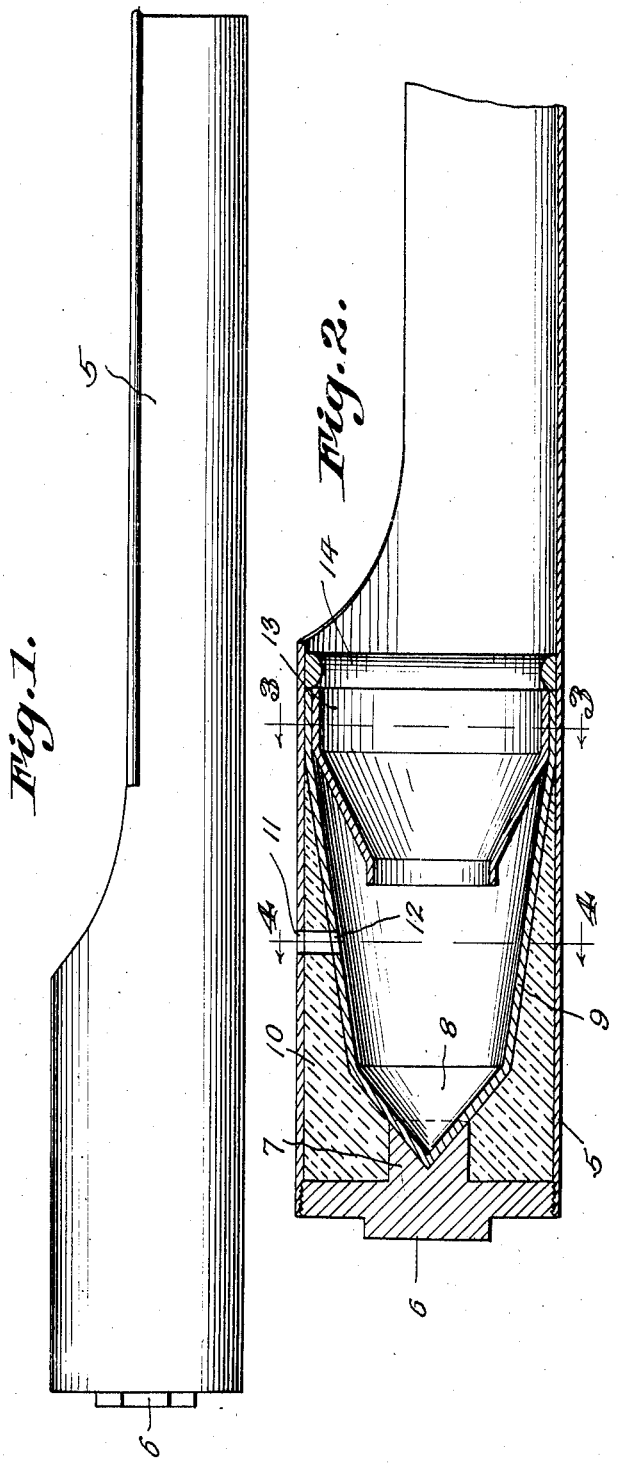
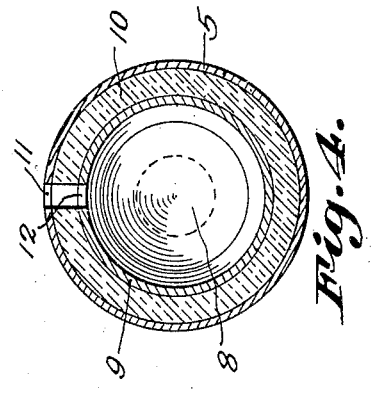
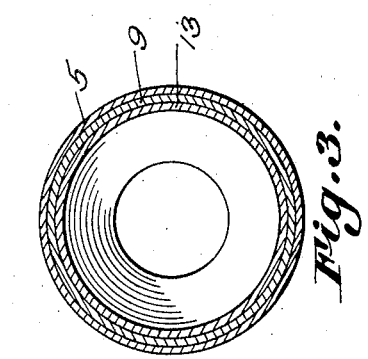
L. R. Neal
INVENTOR.
BY Patented Jan. 12, 1943

2,308,098

UNITED STATES PATENT OFFICE 2,308,098

SOLDERING IRON STAND

Lee R. Neal, Burbank, Calif.

Application August 11, 1941, Serial No. 406,430

4 Claims. (Cl. 113—111)

This invention relates to a combined soldering iron stand and soldering iron conditioner.

The primary object of the invention is to provide a soldering iron stand which is constructed so that the soldering iron head positioned therein will be completely housed, means being provided for permitting a material to be supplied within the holder while the iron is resting therein, for maintaining the iron tip in a well tinned condition at all times, permitting the iron to be run at high heat for long periods of time, without corrosion of the tip.

Another object of the invention is to provide a combined soldering iron holder and conditioner which will maintain the soldering iron hot for a long period of time, resulting in faster and better soldering.

A still further object of the invention is to provide means for increasing the life of the tip of the iron, by reducing the amount of cleaning and filing of the iron necessary in maintaining the iron in a working condition.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a side elevational view of a soldering iron holder and conditioner, constructed in accordance with the invention.

Figure 2 is a longitudinal sectional view through one end of the device.

Figure 3 is a sectional view taken on line 3—3 of Figure 2.

Figure 4 is a sectional view taken on line 4—4 of Figure 2.

Referring to the drawing in detail, the reference character 5 designates the body portion, which preferably is substantially tubular in formation, the upper portion thereof being cut away throughout substantially two-thirds of the length of the body portion, providing an opening so that a soldering iron may be readily positioned therein.

One end of the body portion is closed by means of the screw plug 6 which is formed with an extension 7 that in turn has a substantially cone-shaped recess formed in the inner end thereof, the cone-shaped recess being of a size to accommodate the tapered end 8 of the tubular member 9 that provides the housing for the head of the iron, positioned within the device.

As clearly shown by the drawing, the tubular member 9 is of a diameter to provide a space between the member 9 and tubular end of the body portion, the space being filled with asbestos or other suitable insulating material indicated at 10, to the end that the head of the soldering iron positioned in the member 9, will be maintained hot, for a considerable length of time.

An opening indicated at 11 is formed in the body portion, the opening registering with the opening 12 of the member 9, so that when the head of a soldering iron has been positioned within the member 9, wire solder may be fed into the member 9 through said opening, the wire solder contacting with the heated head of the soldering iron to melt the wire solder that flows to the tip of the soldering iron head, which extends into the tapered end 8 of the member 9. Thus it will be seen that the soldering iron is maintained in perfect working condition at all times since it is well tinned. Disposed within the inner end of the member 9, is a sleeve 13 which tapers towards the front end of the body portion, the tapered end of the sleeve being open providing a substantially large opening, or an opening capable of permitting the head of the usual soldering iron, to be extended therethrough. The space between the member 13 and member 9, provides a compartment or reservoir into which the tinning material may flow, to the end that the tinning material will be held within the member 9 and prevented from flowing into the main portion of the holder.

The member 9 and sleeve 13 are held in position against the ring 14 which is positioned at the mouth of the soldering iron head receiving end of the holder.

On using the holder, a hot soldering iron is positioned in the holder, the head of the soldering iron being extended through the sleeve 13 and into the member 9. The tip of the soldering iron will pass into the tapered portion 8 of the member 9. The end of a length of wire solder will now be extended through the openings 11 and 12, to contact with the hot soldering head of the iron. The solder will of course melt and flow over the head and tip of the soldering iron, maintaining the tip of the iron tinned at all times, permitting the iron to be run at high heat for long periods of time, without corrosion of the tip. By reducing the corrosion of the tip, it will be obvious that frequent cleaning and filing of the tip is unnecessary, with the result that the life of the tip is greatly increased and the head of the iron is so conditioned that it will maintain heat for a longer period of time.

Means may be provided whereby the holder may be supported in various positions, without departing from the spirit of the invention.

What is claimed is:

1. A combined soldering iron conditioner and stand, comprising a tubular body portion having an open side, a tubular member positioned within one end of the body portion in spaced relation therewith, a plug closing one end of the body portion and supporting one end of said tubular member, the space between the body portion and the tubular member being filled with insulating material, said body portion and tubular member having registering openings through which soldering material may be directed to the tubular member and iron held therein, and a sleeve secured within one end of the tubular member and being tapered toward the front end of the tubular member adapted to engage the iron positioned therein, closing the space between the iron and body portion.

2. A combined soldering iron conditioner and stand, comprising a tubular body portion, one end of said body portion being closed, a tubular member fitted within the closed end of the body portion in spaced relation therewith, the space between the body portion and tubular member being filled with insulating material, a sleeve secured within one end of the tubular member and adapted to closely engage the head of a soldering iron positioned within the tubular member, the inner end of the sleeve being spaced from the tubular member, and said body portion and tubular member having registering openings through which soldering materials may be directed to a soldering iron head held within the tubular member.

3. A combined soldering iron conditioner and stand, comprising a tubular body portion having an open side, a tapered tubular member secured within one end of the body portion and spaced from the body portion, providing a space for the reception of insulating material, a plug closing one end of the body portion and having a tapered recess into which the tubular member extends, a sleeve positioned within one end of the tapered tubular member and adapted to grip a soldering iron held therein, and said body portion and tapered tubular member having registering openings through which soldering material is fed to a soldering iron positioned in the tapered tubular member.

4. A combined soldering iron conditioner and stand, comprising an elongated body portion having an open side extending throughout a portion of the length thereof, a ring positioned within the body portion and spaced from one end thereof, a tubular member fitted within one end of the body portion and adapted to engage said ring, a sleeve within the tubular member and engaging the ring, said ring preventing movement of the tubular member and sleeve in one direction, one end of the tubular member being tapered, a plug closing one end of the body portion and having a tapered recess adapted to accommodate the tapered end of the tubular member, holding the tubular member in spaced relation with respect to the body portion, insulating material filling the space between the tubular member and the body portion, and said body portion and tubular member having registering openings, through which soldering material is directed to a soldering iron positioned within the tubular member.

LEE R. NEAL.